March 19, 1929.  S. G. WINGQUIST  1,706,272
POWER TRANSMISSION
Filed March 22, 1926   2 Sheets-Sheet 1

INVENTOR:
Sven Gustaf Wingquist,
By Attorneys,
Fraser Myers + Manley

March 19, 1929. S. G. WINGQUIST 1,706,272
POWER TRANSMISSION
Filed March 22, 1926  2 Sheets-Sheet 2

INVENTOR:
Sven Gustaf Wingquist,
By Attorneys,

Patented Mar. 19, 1929.

1,706,272

UNITED STATES PATENT OFFICE.

SVEN GUSTAF WINGQUIST, OF GOTTENBORG, SWEDEN.

POWER TRANSMISSION.

Application filed March 22, 1926. Serial No. 96,528.

This invention relates to variable speed hydraulic power transmissions adaptable for use in power driven vehicles, elevator drives, and in fact as a heavy duty variable speed connection between any source of power and a driven load.

One object of the invention is to provide a power transmission in which driving ratios both above and below direct drive are available.

The invention further provides a device of the described type in which various transmission ratios are established by variously coupling pump elements together mechanically.

A further object of the invention is to provide a transmission in which a plurality of transmission ratios are automatically controlled.

Other objects of the invention will be set forth in detail in connection with the description and explanation of the accompanying drawings, in which.

The embodiment of the invention illustrated in Figs. 1 to 8 inclusive comprises a transmission of the differential pumping type. The characteristic feature of this general type of hydraulic transmission is that the flow of fluid from one or more delivery pumps to one or more receiving pumps or motors, is proportional to the difference in speed between the driving and driven elements, so that in direct drive the pumps are idle, and only when the driven shaft is required to rotate at a speed other than that of the driving shaft is there any delivery of fluid from one pump to another. A relatively large part of the engine power is transmitted directly from the driving to the driven shaft through fluid pressure and acts independently of any relative movement of the pumping parts.

Figure 1:
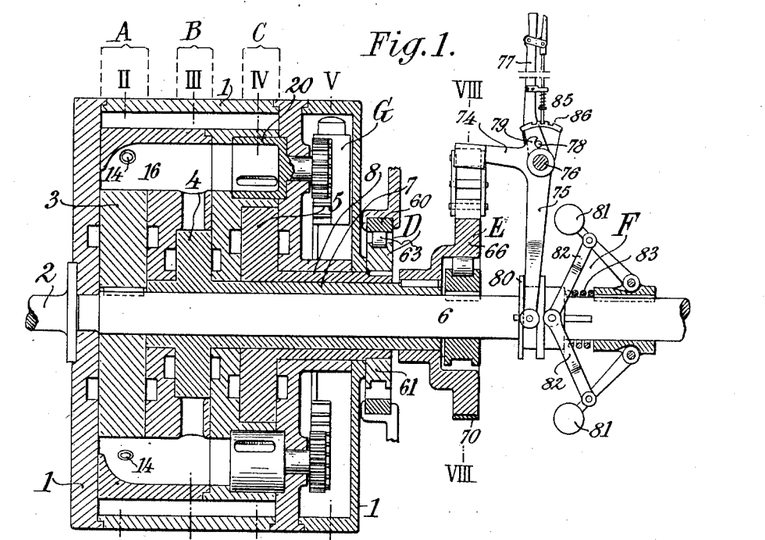
Figure 1 is a vertical cross-section taken along the axis of the transmission.

In the present embodiment the transmission utilizes three fluid pumps, these three pumps being indicated by the brackets lettered A, B and C in Fig. 1. These pumps are preferably of the rotary vane type and are constructed in such manner as to provide a uniform flow of fluid per degree of angular movement throughout each revolution. Such type of pump is preferable because the drive resulting therefrom is smooth and continuous, whereas, if various types of eccentric rotary pumps or reciprocating pumps are used, the drive is decidedly irregular, requiring some additional means to render the drive smooth.

A general disclosure of the differential pumping type of transmission will be found in my United States Patent No. 1,603,179, granted October 12, 1926.

Figure 5:
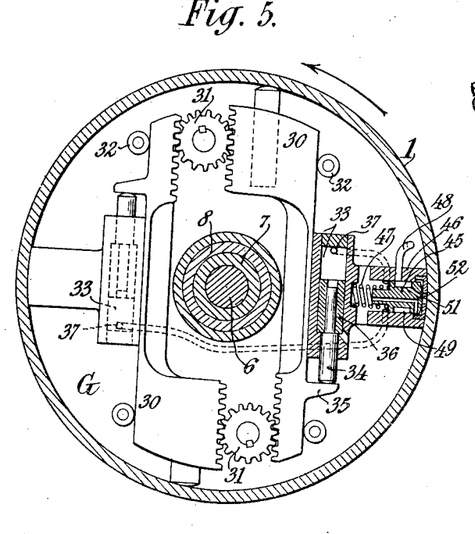
Fig. 5 is a transverse cross section taken through the chamber in which the automatic valve control for the transmission is located along the line V—V of Fig. 1.
Figure 6:
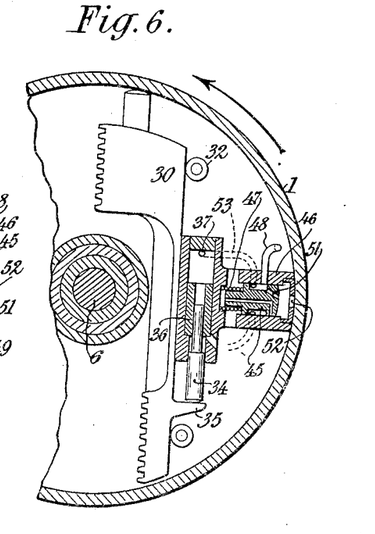
Fig. 6 is a fragmentary section similar to Fig. 5 showing the automatic valve control mechanism in a second position.
Figure 7:
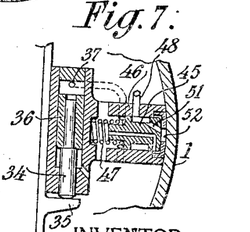
Fig. 7 is a fragmentary section similar to Figs. 5 and 6, showing the automatic valve control mechanism in a third position.

The automatic valve control illustrated in Figs. 5, 6 and 7 forms the subject-matter of my co-pending United States application Serial No. 91,758, filed March 2, 1926. Such application also claims other features of the invention which will only be briefly described herein.

Referring to Fig. 1, the transmission comprises a rotor 1 which receives power from any suitable source through a driving shaft 2. The rotor 1 commonly provides the external elements required by the three rotary vane pumps A, B and C respectively. Within the common driving rotor 1 are mounted three elements 3, 4 and 5 adapted to co-operate with the aforesaid external pump elements to form the rotary vane pumps A, B and C respectively. The internal pump element or rotor 3 is preferably rigidly and permanently fastened to the driven shaft 6. The element 3 will hereinafter be referred to as the driven rotor. The pump element 4 is rigidly mounted on a sleeve 7 surrounding the driven shaft 6, such sleeve extending, as shown in Fig. 1, to the right outward through the housing 1. The free end of sleeve 7 to the right of the housing is provided with a combination brake and ratchet device E, which will hereinafter be more fully described. The function of said device is to alternatively couple the internal pump element 4 with the driven shaft, or to render such element stationary. The former function is had through the action of the ratchet mechanism by which the said pump element 4 is never permitted to rotate in the same direction with the driven shaft 6 at a speed in excess of that of said shaft; the latter function of rendering stationary the said element 4 is had through the action of simple braking means. It will thus be apparent that the internal element 4 of the pump B may, under certain circumstances, be rendered stationary to act as a stator, and under other circumstances, coupled to the driven shaft in such manner that it acts as a driving rotor. In the latter case it contributes to the torque on the driven shaft in exactly the same manner as does the simple driven rotor 3 previously referred to.

The third internal pump element 5 co-operates with the common housing 1 to form the receiving pump or motor C, and is provided with a sleeve extension 8 which, similarly to the sleeve 7, projects through the right hand end of the housing 1. The free end of the sleeve 8 is connected through a ratchet mechanism D with a stationary part of the transmission in such manner that free rotation of the element 5 is permitted in the direction of motion of the driving and driven shafts, but rotation in the opposite direction is prevented.

Figure 2:
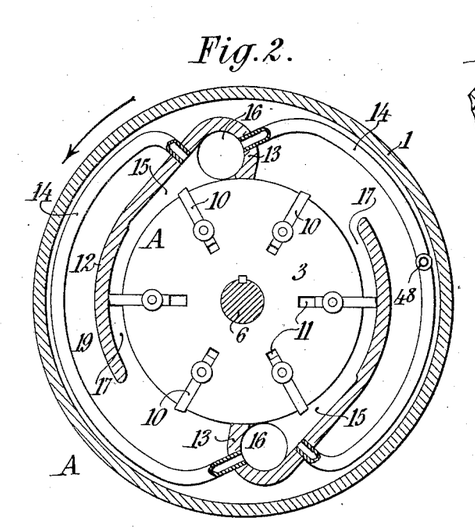
Fig. 2 is a transverse cross-section taken along the line II—II of Fig. 1.
Figure 3:
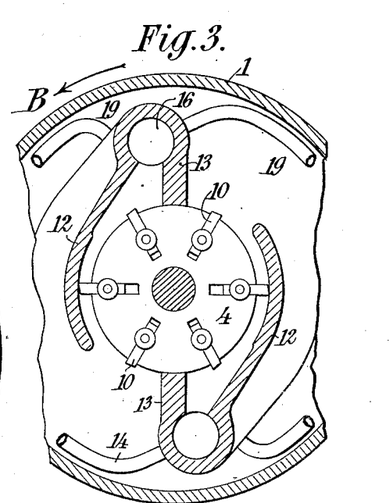
Fig. 3 is a transverse cross section taken along the line III—III of Fig. 1.
Figure 4:
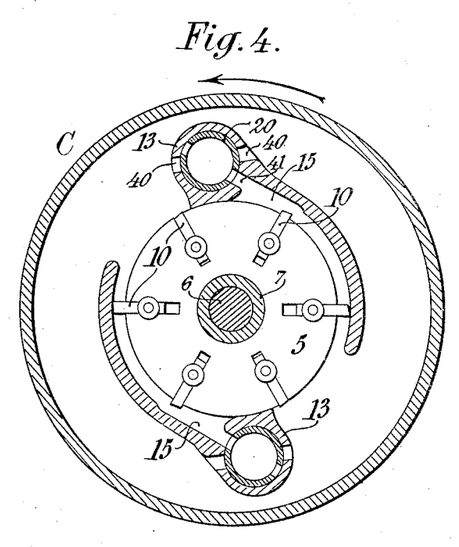
Fig. 4 is a transverse cross section taken along the line IV—IV of Fig. 1.

Each of the pumps A, B and C formed between the housing 1, which comprises the common driving rotor, and the three internal elements 3, 4 and 5 respectively, are constructed as rotary vane pumps. The details of the three pumps referred to are shown in Figs. 2, 3 and 4 respectively. Each of the pumps is formed between the common external rotor 1 and an internal rotor, that is to say, an element as between which and the surrounding rotor 1 there is a relative rotation, although under certain circumstances the internal elements of the pumps B and C may, as before pointed out, be stationary, while the common driving rotor 1 is in motion.

In each of the internal rotors 3, 4 and 5 are mounted a plurality of vanes 10, which are adapted to freely slide in radial slots 11. The vanes 10 co-operate with working surfaces 12 formed in the external common driving rotor 1 and abutments 13 in a manner well understood, to produce a circulation of fluid through the pumps. The radial position of the vanes is controlled by a cam ring so as to cause the vanes to effectively co-operate with the working surfaces 12 to move the fluid in the pump chambers, and to be moved inwardly within their rotors to escape the abutments 13 when passing them. The cam ring referred to is not herein illustrated or further described because it is fully disclosed in one of my co-pending United States applications previously referred to. It will be observed that each of the pumps is of the duplex type, each being provided with two working surfaces and two abutments. This construction is preferred because in such a pump the fluid pressures exerted on opposite sides of the rotors are substantially balanced, resulting in a material reduction of load on the transmission bearings. Obviously, any other symmetrical arrangement of a plurality of abutments would accomplish the same result.

For the purpose of securing perfect fluid balance between the opposed chambers of the duplex pump A, conduits 14 are provided which afford a direct communication therebetween. Under unusual circumstances one of the pressure chambers 15 of the pump A might be filled with fluid and the other only partially filled. Since the transmission medium is preferably oil or some other substantially incompressible fluid, such a condition would result in the entire pumping duty being thrown on the side of the rotor which had a full pressure chamber. This would set up a heavy unbalanced thrust between the internal and external pump elements unless the pressure between the full pump chamber and the partially filled pump chamber were equalized. This function will obviously be performed by the equalizing conduits 14 in such manner as to always insure the equal distribution of pressure between the opposed pumping chambers.

The abutments 13 of the three pumps A, B and C are preferably disposed in substantially the same plane parallel to the axis of the transmission. By this arrangement short straight pressure channels 16 may be situated at the end of the pressure chambers 15 of the three pumps and close to the abutments. It is highly desirable to keep the main fluid channels as short and free from bends as possible to avoid fluid resistance. The pressure channel 16 affords the most direct connection possible between the pressure chambers of the three pumps. The pressure channels 16 at their right hand ends are provided with cylindrical valve members 20, which have the double function of: (1) establishing and cutting off communication between the pressure chambers of the two pumps A—B; and the receiving pump or motor C, and (2) by-passing, when a condition of slipping clutch drive or free engine is required, the flow of fluid from the pressure chambers of the delivery pumps to the receiving chambers thereof. It may here be pointed out that the receiving chambers 17 of the pumps are in open communication with the common idle fluid reserve space 19 provided within the housing 1, which fluid reserve space is represented by the entire area within the housing not occupied by the parts of the pumps, connections and control means therefor.

The valves 20 interposed between the pumps A, B, and motor or receiving pump C, and also the automatic control mechanism for such valves illustrated in Figs. 5, 6 and 7, form the subject-matter of my co-pending United States application Serial No. 91,758, previously referred to, and need here only be referred to in so far as there is a co-operative relationship between the aforesaid automatically controlled valves and the automatic control device of the present invention generally referred to by the letter F. The latter device, while in no way directly affecting the automatic valve action, does influence the behavior of the pump B in such manner as to alter its pumping capacity per unit of time, and by such control of the pump B does effect changes in the drive ratio of the transmission. Inasmuch as it is also the function of the automatic valve control, which we will hereinafter refer to as the control G, to effect changes in the driving ratio of the transmission, the relative timing of the two control devices F and G must be considered in order to understand under any given conditions of speed and load what transmission ratio will be automatically established.

A study of my previous applications hereinbefore referred to will make entirely clear the general operation of hydraulic transmissions of the present type. A brief description of the operation will, however, be given here. Disregarding the pump B, the action of the transmission will be as follows: If the rotary valve 20 be adjusted to the position in which no outlet is provided for the fluid trapped in the pressure chambers of the delivery pump A, the transmission will act substantially as a mechanical coupling. Since no fluid can escape from the pressure chambers of the delivery pump, the rotation of the driving housing 1 by the drive shaft 2 will cause the driven rotor 3 and the driven shaft 6 to rotate at the same speed. The entire driving torque is transmitted, however, from the driving rotor to the driven rotor through the fluid which is trapped between the vanes and abutments of the delivery pump.

When a reduced gear ratio is required, the valves 20 will be automatically adjusted by the combined action of centrifugal force and fluid pressure on the automatic valve control mechanism G, to a position in which communication is established between the pressure chambers of the delivery pumps A, B and the receiving pump or motor C. It will be observed that the pressure chambers 15 of the pumps A and B and motor C are disposed on opposite sides of the abutments 13. When the valve 20 establishes the communication between the pressure chambers of the pumps A, B and C, a path of escape is provided for the fluid formerly trapped in the pressure chambers of the delivery pumps A, B. The escape, however, is not unrestricted, as the fluid which is forced out of a delivery pump by the slippage between the driving and driven rotors can only flow into the receiving chambers of the receiving pump C. Since the receiving capacity of the receiving pump or motor C is definitely determined by the speed of rotation of the driving rotor 1, with respect to the internal element 5, which latter, in the present instance is held stationary by the ratchet device D, the rate of slip between the driving and driven rotors will obviously be positively determined. As it is sometimes stated, the motor C acts as a measuring pump to determine the rate of flow, and consequently, the ratio of slip between the driving and driven parts of the delivery pump A. It will furthermore be observed that the action of the fluid delivered under pressure to the active chambers of the receiving pump or motor C, is to exert a thrust against the abutments 13 in a direction favorable to the rotation of the driving rotor 1, of which such abutments form a part. Pressure is, of course, exerted against the vanes 10 of the receiving pump or motor in a contrary direction, but since the internal element 5 of such receiving pump is prevented from rotating in a direction opposite to the driving rotor by the action of the ratchet device D, the internal element 5 will act as a stator, merely serving as a fixed support for the vanes against which the fluid will react to aid in the propulsion of the external driving rotor 1. The receiving pump or motor C acts virtually as a booster to supplement the torque supplied to the driving rotor by the engine. This additional torque will be transmitted to the driven shaft through the driven rotor 3 by virtue of an increased fluid pressure within the pressure chambers of the pumps.

The speed ratio of the transmission is determined by the relative capacities of the delivery and receiving pumps that may at any time be in operation. Thus when the pumps A, B are delivering fluid to the receiving pump C, the transmission ratio is determined by the relationship between the combined pumping capacity of pumps A, B, as compared with the receiving capacity of the pump C. The actual speed ratio of the transmission when pump C is acting as a motor is readily determined by the equation:

$$\frac{\text{Driving speed}}{\text{Driven speed}} = \frac{D}{D-M}$$

Where $D$ = the volumetric capacity of the delivery pump per revolution between its component elements and $M$ = the volumetric capacity of the receiving pump or motor per revolution between its component elements.

Consideration of the above formula reveals the fact that when the capacity of the receiving pump equals the capacity of the delivery pump, the speed ratio becomes infinite, that is to say, the driving rotor will continuously rotate without producing the slightest rotation of the driven rotor.

Substituting other values for the capacities of the delivery pump A and the receiving pump or motor C, the speed ratios will be, as follows:

| Del. pump capacity | Receiving pump capacity | Transmission ratio |
|---|---|---|
| 3 | 2 | 3 to 1 |
| 4 | 2 | 2 to 1 |
| 3 | 1 | 1.5 to 1 |

Obviously, any other desired transmission ratio can be secured by adopting the appropriate relationship between the capacities of the delivery and receiving pumps.

Having set forth the principle of operation of the simplest form of transmission in which only a single delivery and receiving pump are employed, the operation of the device incorporating three pumps, as hereinbefore described and illustrated, will now be set forth.

We will first consider the operation of the transmission when the special pump B is coupled to the driven shaft through the automatic ratchet of the device E. Such ratchet, as hereinbefore described, is so disposed as to transmit any torque delivered to the rotor 4 of the pump B in a direction corresponding to the rotation of the driven shaft. When such mechanical connection between the rotor 4 and the driven shaft is operative, it will be observed that the rotor 4 will act in a manner identical with that of the rotor 3 of the delivery pump A. Under this condition of operation the pump B will act in multiple with the pump A, the only difference between the two being that since the rotor 4 of pump B is smaller than the rotor 3 of the pump A, the contribution of the pump A in the delivery of fluid will be considerably greater than that of pump B.

The effect of combining the two pumps A and B in this manner is quite the same as if, in a transmission which had only the pumps A and C, the capacity of the pump A were increased. If, for example, we consider that the pumping capacity of the pump A be represented by 3, and the capacity of the pump B is 1, then the combined pumping capacity of the two pumps will be 4. If we further assume that the receiving pump or motor C has the same capacity as that described in connection with the operation of the simplest pumping system, i. e., a capacity of 2, the pumping capacity of the combined delivery pumps will be twice that of the receiving pump or motor. Consideration of the formula for the transmission ratio indicates that a capacity ratio between the delivery and receiving pumps of 2 to 1 results in a transmission ratio of 2 to 1. Thus, if a 2 to 1 ratio is desired, this can be had by combining two delivery pumps A and B, whose capacities are respectively 3 and 1, with a receiving pump C, the capacity of which is 2.

If the inner element 4 of the pump B is now rendered stationary by the application of a braking force upon the drum 66 of the mechanical control device or selective coupling E, another transmission ratio quite different from that above described will result. The rate of fluid delivery from the pump B when its internal element 4 is rotating with the driven shaft is very much less than when such internal element is rendered stationary. In the former case the effective speed of the pump B is determined by the difference in speed between the driving and driven shafts, whereas in the latter case the effective speed of the pump B is the difference in speed between the speed of the driving shaft and zero, which latter will at all times be greater than the former, because the driving and driven shafts rotate in the same direction. With the transmission adjusted in the latter manner there are virtually two stators, the internal elements 4 and 5 being stationary. The only difference now existing between the pumps B and C except for their difference in size, is that fluid under pressure acts on the opposite sides of the abutments of the two pumps. In both of the pumps the effective speed of rotation is the same. The result of this arrangement is that the delivery pump B continuously supplies to the receiving pump or motor C a quantity of fluid, and this has the effect of reducing the available receiving capacity of the pump C with respect to fluid delivered from the main delivery pump A. If the capacity of the receiving pump C be placed at the value previously chosen, namely, 2, and the capacity of the pump B at 1, it will be apparent that the supply of fluid from the pump B to the receiving pump or motor C will cut the effective receiving capacity of the latter in half, the motor now only being able to receive from the pump A one unit of fluid per revolution instead of two.

With the capacities of the pumps above chosen, the transmission ratio will be determined by applying the formula hereinbefore given, bearing in mind that the effective capacity of the receiving pump C is now only 1. We find that with a capacity of 3 for the delivery pump A and a capacity of 1 for the receiving pump C, the transmission ratio is 1.5 to 1.

A transmission as hereinabove described may be progressively set for transmission ratios of first, 2 to 1; second, 1.5, to 1; and then direct drive. Effecting a coupling between the rotor 4 of the pump B, and the driven shaft gives the first-mentioned speed; then releasing said rotor from the driven shaft and rendering it stationary gives the second speed. Direct drive is then effected by closing communication between the delivery and receiving pumps by moving the valves 20 into the closed position, and simultaneously with the movement of the valves, releasing the rotor 4 for free rotation with the driven shaft 6. As is well understood, when fluid is trapped between the driving and driven rotors of the delivery pumps, the transmission will act as a substantially rigid mechanical drive with no slip between the driving and driven parts thereof.

In automobile drivers, for example, it is sometimes highly advantageous to have a transmission ratio higher than direct drive. As is well known in the art, the direct drive results in a speed relationship between the engine and the rear wheels which is considered the most satisfactory compromise between conditions which make for high speed and those which provide hill-climbing ability and rapid acceleration. A car which is very fast in high gear, unless it is provided with an engine of excessive horse power, is generally a poor car for climbing hills "in high", and cars that in high gear will readily negotiate average grades are rarely ever very fast. For this reason it is desirable to have a direct drive which represents a good compromise speed for general utility, and an additional higher speed ratio which can be brought into use when great speed is desired and where the road conditions are so favorable that comparatively small torque is required at the rear wheels. Under such conditions the car may be propelled at high velocity without turning the engine over at speeds which are excessive, thereby permitting considerably greater flexibility in the operation of a motor vehicle and at the same time minimizing wear on the working parts of the engine when high road speed is required.

Where variable speed mechanical gearing is relied upon for the drive between the engine and the rear wheels of the car, the use of a gear ratio higher than direct drive is not generally favored because of the fact that gears working at high speed produce very considerable noise. In the present type of hydraulic transmission, however, the operation of the rotary fluid pumps is practically silent, and thus a speed higher than direct may be employed without the great disadvantage inherent in the use of ordinary mechanical gearing.

The speed ratio higher than direct drive is obtained in the following manner: The receiving pump or motor C is put out of operation by closing the valves 20. Since no fluid now enters the chambers of the receiving pump, tending to cause the rotor 5 thereof to lag behind the driving rotor 1, the first-mentioned rotor will revolve idly with the driving rotor. The internal element 5 of pump C, as is heretobefore set forth, is always free to rotate in the direction of the driving rotor because of the automatic release of the ratchet mechanism D when torque is applied in this direction. As far as the operation of the transmission in producing a gearing up effect is concerned, the pump C can be entirely disregarded.

The only adjustment of the transmission other than closing the valve 20 to produce the gearing up effect, is the rendering stationary of the element 4 of the pump B so that such element acts as a stator. As has already been pointed out, this is accomplished by applying a braking force to the brake drum 66 of the brake and ratchet device E.

With the transmission adjusted as above described, it will be obvious that when the driving rotor 1 is set in motion a pumping action will be set up in the pump B due to the relative motion between the housing and the stator 4, which together, form the two elements of the said pump. It will be borne in mind that the pressure chambers of the pumps A and B are always in open communication through the channels 16. The pumping action in the pump B is positive, that is to say, if the driving rotor revolves, since the stator element 4 is fixed, a definite amount of fluid must be delivered from the pump B during each revolution. The only path of escape for this fluid is through the pressure chambers of the pump A, which chambers can expand to receive the fluid from the pump B only by a rotation of the rotor 3 of the pump A, at a speed in excess of the driving rotor 1. Under such conditions the pump A, which normally acts as a delivery pump, becomes a receiving pump or motor, fluid delivered to it from the delivery pump B causing a rotation in the same direction as that of the driving rotor 1 but at a greater speed. The equation representing the increase in speed referred to may be stated as follows:

$$\frac{\text{Driving speed}}{\text{Driven speed}} = \frac{A}{B+A}$$

Where $A$ = the volumetric capacity of the pump A acting as a receiving pump, and
$B$ = the volumetric capacity of the pump B acting as a delivery pump.

If the capacities of the two pumps A and B previously chosen be substituted in the above equation, it will be found that with the pumping capacity of 1 for the pump B and a capacity of 3 for the pump A now acting as a motor, the transmission ratio between the driving and driven shafts will be 3 to 4. In other words, the driven shaft is rotating 33⅓% faster than the driving shaft. This increased transmission ratio above direct drive represents probably the maximum ratio increase desirable in an automobile drive. Obviously, this ratio can be reduced, if desired, either by increasing the capacity of the pump A or decreasing the capacity of the pump B.

With the volumetric capacities of the pumps A, B and C hereinbefore arbitrarily placed at 3, 1 and 2 respectively, the transmission progressively adjusted to its several conditions of operation, provides the following drives: (1) free engine; (2) gradual clutching action whereby a vehicle may be accelerated from a standing start; (3) a transmission ratio between the driving and driven shafts of 2 to 1; (4) a transmission ratio of 1.5 to 1; (5) direct coupling (1 to 1 drive); (6) an overspeed drive of 1 to 1.33+.

In the embodiment of the invention illustrated, the automatic valve control mechanism G is similar to that covered by my co-pending United States application Serial No. 91,758 hereinbefore referred to. This device is preferably at all times under the simultaneous control of centrifugal force and fluid pressure. The centrifugal force being a function of the speed of the engine, indicates to a certain extent the capacity of the engine to perform work, and fluid pressure indicates the load that the engine is subjected to. If means sensitive to centrifugal force and fluid pressure be properly designed and opposed in their operation, an automatic transmission ratio control will be provided in which, for a given torque load the transmission ratios will be automatically decreased as the speed of the engine increases, and increased when the speed of the engine falls off. Furthermore, if the speed of the engine remains constant, such a control device will also act to increase the transmission ratio when the load increases, and vice versa. For a complete description of the automatic control device G, my above-mentioned application should be referred to.

The valve control device G will here be very briefly described. In a compartment at the right hand end of the transmission housing forming the driving rotor 1 are situated two centrifugally actuated governor weights 30. These weights are provided with rack teeth, as shown in Fig. 5, which teeth engage pinions 31 which are rigidly fastened on extensions of the rotary valves 20 previously referred to. The weights 30 are guided by rollers 32 so as to freely slide under the controlling influence of centrifugal force and fluid pressure to rotate the valves 20 to their various positions.

Fluid pressure acts upon the governor weights 30 through compound piston devices which being substantially alike, are each described as follows. Within each cylinder 33, and projecting from the open end thereof, is a plunger 34, the outward end of which bears against a shoulder 35 formed on the sliding weight 30. Within the cylinder 33 a piston 36 of annular cross-section surrounds the plunger 34. When the annular piston 36 and plunger 34 are in the position indicated in Fig. 7, fluid which is admitted to the cylinder through port 37 will produce a thrust on the plunger due to the combined effect of the fluid acting on the inwardly exposed end of the plunger and also to the force transmitted to the plunger from the annular piston surrounding it.

When fluid pressure is admitted to cylinders 33, the force exerted thereby on the piston and plunger operating in each cylinder will always be sufficient to overcome the opposing effect of centrifugal force and move the valve 20 to the position in which communication is established between the delivery pumps A, B and motor C. When the valve is in this position the parts of the control device G are in the positions indicated in Fig. 5.

From the position of the plunger 34 shown in Fig. 5 to the extreme outward position of the plunger shown in Fig. 6, the plunger must move against the centrifugal force of the weights 30 without the aid of the annular piston 36, which, before it came to the end of the cylinder 33, as shown in Fig. 5, assisted the outward movement of the plunger. The fluid pressure ordinarily present in the cylinder 33 is not sufficient, acting solely upon the comparatively small exposed area of the plunger 34, to cause it to move outward against the action of centrifugal force. However, if the load on the transmission be sufficiently increased, giving rise to excessive fluid pressures, there will, beyond a certain point, be sufficient pressure, which, acting upon the plunger alone, will cause it to move outward toward the position shown in Fig. 6. With the control device G in the position indicated in Fig. 6, the valve 20 will be rotated into a position in which fluid from the delivery pumps is permitted to freely escape into the common suction or idle fluid chamber of the transmission, this resulting, as hereinbefore set forth, in a condition of free engine, no torque whatever being transmitted from the driving to the driven shaft. Obviously, between the position of the control device indicated in Fig. 5 and that indicated in Fig. 6, the valve will occupy positions affording gradually increased or decreased port openings depending upon the direction of motion of the weights 30. That is to say, starting from the position of Fig. 6 representing free engine, as the engine speed increases centrifugal force will gradually overcome the effect of fluid pressure and move the idling valve port slowly to the closed position, thereby producing a gradual clutching effect. If the plunger is in the position indicated in Fig. 5, upon excessive increase in load the said plunger will move outward, gradually opening the idling valve port, thereby inaugurating a slipping clutch effect which relieves the engine of a certain amount of the load, thereby preventing it from stalling. The idling ports 40 of the valve 20 are shown in the closed position in Fig. 4, the valve position there indicated corresponding to the position of the control device indicated in Fig. 5.

When the piston and plunger in the cylinder 33 are relieved from fluid pressure they are moved by the action of centrifugal force to the position shown in Fig. 7, which position corresponds to direct drive. The corresponding movement of the weights results in a clockwise rotation of the valve 20 (see Fig. 4), so that not only the idling ports 40 are closed, but also the port 41, which provides a communication between the delivery pumps A and B and the motor or receiving pump C.

Whether the annular piston 36 and plunger 34 are in the position corresponding to intermediate speed drive shown in Fig. 5 or are in the position corresponding to direct drive shown in Fig. 7, will always be determined by the presence or absence of fluid pressure within the cylinder 33.

The supply of such fluid to the said cylinder is under the control of a pilot valve 45. This pilot valve comprises a piston valve mounted within a cylinder 46, in which it is free to slide radially with respect to the axis of the transmission. The pilot valve consequently is at all times urged outward by the action of centrifugal force due to the rotation of the driving rotor 1. The action of centrifugal force is also supplemented by that of a spring 47.

Fluid under pressure is at all times supplied to the pilot valve through a conduit 48 which communicates directly with the pressure channel 16 of the transmission connecting the pumps of the transmission. The fluid fills the annular chamber 49 formed in the pilot valve and also passes through a duct 51 to a chamber 52, where it acts upon the effective pressure area of the piston valve and at all times tends to move such valve inward towards the axis of the transmission. When the pilot valve is in the position shown in Fig. 5, no communication is provided between the cylinder 33 in which the main valve actuating piston and plunger are located, and the source of pressure supply, which is the conduit 48. The pilot valve, in the position indicated in Fig. 6, does, however, as shown, provide an open communication between the pressure conduit 48 and the conduit 53 leading to the cylinder 33, the annular chamber 49 of the pilot valve now occupying a position in which it communicates both with the conduits 48 and 53.

It will be apparent that the pilot valve above described is under the simultaneous and opposed influences of centrifugal force and fluid pressure. Furthermore, as hereinbefore set forth, the position of the annular piston 36 in the cylinder 33 will be determined during the normal operation of the transmission, by the presence or absence of fluid under pressure in the said cylinder. Since the supply of fluid to the cylinder 33 is, as above described, always under the control of the pilot valve, it is apparent that the pilot valve absolutely controls the adjustment of the main valve 20 from the position corresponding to direct drive to that of the intermediate speed drive. The pilot valve having practically no work to perform other than to open and close the small ports communicating with the cylinders 33, can be made relatively light and instantaneously responsive to pressure changes within the transmission, and otherwise lends itself to a construction by which the desired transmission ratios can be automatically effected with much greater certainty and under the exact conditions appropriate to such changes.

Figure 8:
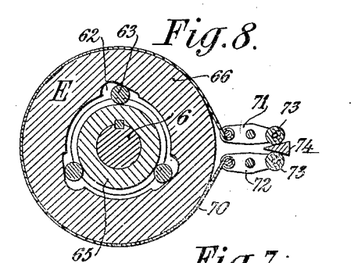
Fig. 8 is a transverse cross-section taken along the line VIII—VIII of Fig. 1.

As has been hereinbefore set forth, the stator 5 of the motor C is automatically released for idle rotation with the driving rotor 1 when the transmission is adjusted to direct drive. In direct drive the valve 20 shuts off all delivery of fluid to the motor C, and consequently, since there is now no fluid tending to rotate the stator 5 in a direction opposite to the rotation of the driving and driven shafts, the stator will be carried around with such shafts. The release of the stator 5 for idle rotation is automatically accomplished by the action of the ratchet device D, which latter device is fully described in my co-pending United States application Serial No. 85,291, filed February 1, 1926. Briefly described, said device comprises a ratchet mechanism of the roller type. A fixed annulus 60, supported on any stationary part of the transmission mounting, surrounds a circular block 61 which is rigidly attached to the sleeve 8 connected to the stator 5. The annulus has formed on its inner surface a plurality of pockets 62, which receive the ratchet rollers 63, as shown in Fig. 8. This figure is in reality a cross-section through the brake and ratchet control device E, but equally well illustrates the roller ratchet of the stator control device D, and particularly the shape of the roller pockets 62. It will be observed that the outer surface of the pockets against which the rollers contact is inclined at an angle to the tangent of the internal block 61. The effect of such a construction, as is well understood, is that a rotation of the inner block in a counter-clockwise direction with respect to the outer annulus is to move the ratchet rollers 63 to the end of each pocket where there is sufficient clearance to permit the rollers to escape from the inner block, thereby permitting it to rotate freely, whereas a contrary rotation of the inner block moves the rollers 63 to a position in which they jam between the inclined surfaces of the roller pockets and the inner block. In the latter position the rollers provide an effective ratchet grip, preventing any further rotation of the inner block in a clockwise direction.

The brake and ratchet device E comprising a selective mechanical coupling, incorporates a roller ratchet which is identical in principle with the construction above set forth. In the present device, however, the circular central block 65 is rigidly keyed to the driven shaft 6, and the surrounding annulus or drum 66 is, instead of being permanently fastened to a stationary part of the device, mounted on and keyed fast to the sleeve 7 of the internal element of the pump B. As hereinbefore set forth, the roller ratchet of the device E is designed so as to prevent the internal element 4 of the pump B from rotating in the direction of the driven shaft at a speed in excess of that of such shaft.

The annulus 66 (see Fig. 8) provides on its outer surface a brake drum upon which a brake band 70 is adapted to contract when it is desired to render the pump element 4 stationary. The annulus will be automatically released from the driven shaft 6 when it is gripped by the brake band because of the operation of the one way drive ratchet device by which the annulus and shaft are connected.

The brake band 70 may be controlled manually and is also subject to the automatic control of the governor mechanism F, which will be presently described. The two ends of the brake band 70 are pivotally attached to rocking arms 71 and 72, the latter being pivotally mounted at their centers upon a fixed part of the transmission or vehicle frame. The free ends of the arms 71 and 72 carry rollers 73, between which an actuating member of wedge-like cross-section is adapted to be moved to apply or release the described band brake. The wedge-shaped actuating member comprises one arm 74 of a bell-crank, the other arm 75 of which is adapted to be actuated by the centrifugal governor device F. The bell-crank is pivoted for free rotation on a fixed shaft 76. Adjacent to the bell-crank 74, 75 and commonly pivoted on the shaft 76 therewith, is a hand lever 77 which acts upon the said bell-crank through a one way drive. The said drive comprises a lug 78 projecting from the side of the lever 77 and disposed in a position to engage a shoulder 79 formed on the hub of the said bell-crank. By this construction it will be apparent that while the bell-crank 74, 75 can be swung in a counter-clockwise direction to apply the brake of the rotor controlling device E by a manual actuation of the lever 77, the said bell-crank is also free to move to the position in which the brake is applied under the influence of the automatic governor control F quite independently of manual actuation of the brake setting lever 77.

The downwardly projecting arm 75 of the bell-crank is forked to be received by a grooved collar 80 which is slidably splined to the driven shaft 6. The axial position of the said collar 80 is determined by a centrifugal governor mechanism, as shown in Fig. 1. This governor may be of any conventional type and is rotated by the driven shaft 6. The action of centrifugal force upon the governor weights 81 is to move the actuating links 82 connected to the aforesaid collar 80 in such direction as to apply the band brake to the rotor control device E. The movement of the collar 80 toward the position in which the said brake is applied (to the right in Fig. 1) is resisted by a spring 83 surrounding the shaft 6. Thus it will be seen that the brake will be automatically applied only at driven shaft speeds in excess of a pre-determined value.

The governor device F, including the ballasting spring 83, should be adjusted so that the rotor 4 will be automatically braked at a speed which indicates a capacity of the engine to propel the load in the transmission ratio above direct drive. This adjustment will obviously be for a speed in excess of the average speeds at which the valve control device G is automatically set for direct drive.

Where the intermediate speed ratio of 1.5 to 1 is desired prior to the transmission automatically shifting into direct drive by virtue of the action of valve control device G, the rotor 4 of the pump B can be manually checked, by moving the hand lever 77 to the position indicated in Fig. 1. In this position the pin 78 acting against the shoulder 79 of the bell-crank causes the arm 74 to move between the rollers 73 of the brake-contracting arms 71, 72 to brake the rotor 4. The hand lever is retained in either a brake setting or brake releasing position by means of a releasable detent 85 which is adapted to engage a notched sector 86.

Obviously, if the hand lever 77 is left permanently set in the position indicated, in which position the brake will be constantly applied to check the rotation of rotor 4 of the pump B, the transmission ratio of 2 to 1 that is had when the rotor 4 is permitted to rotate with the driven shaft 6, will not be available. The same is also true of direct drive, because when the control device G moves the valve 20 to a position in which no fluid can pass from the delivery pumps to the motor C, there will be a delivery of fluid from the pump B to the pump A, as hereinbefore set forth, such delivery of fluid giving rise to the "overdrive" or drive above direct coupling. Thus, when the brake is manually applied to the rotor controlling device E, the transmission ratios will be respectively 1.5 to 1 and 1 to 1.33+, as compared to the speed ratios of 2 to 1 and direct drive which are obtained when the said brake is not manually applied. This mode of operation provides a desirable adjustment which can be manually made in accordance with the load that a motor vehicle may be required to carry. In automobile trucking it is apparent that the transmission ratios required when a truck is fully loaded with, let us say, a five ton load, will be quite different from those required when the truck is empty, if two trips be taken over the same identical course. The manual control above described, while not interfering with the automatic transmission ratio control through the operation of the automatic valve-setting mechanism G, does determine whether the ratios automatically established shall be 2 to 1 and direct drive, or 1.5 to 1 and the "overdrive" of 1 to 1.33+, the latter ratios being suitable for operation of the vehicle when empty, and the former when under a full load.

It will further be evident that should two intermediate speeds be required prior to direct drive, these can be had simply by starting the vehicle up with the manual control lever first in the position in which the rotor 4 is not braked, this giving rise to a speed ratio of 2 to 1; second, manually applying the said brake, thereby giving rise to a speed ratio of 1.5 to 1; a subsequent manual release of the brake when the automatic control device G closes the valve 20 will then institute direct drive. As previously set forth, upon a sufficient increase in speed above that at which direct drive is determined by the automatic valve control mechanism G, the governor device F will automatically set the brake device to check the rotation of the rotor 4, thereby automatically instituting the overdrive, which, in the embodiment described, represents a speed ratio of 1 to 1.33+.

While only a single embodiment of my invention has been hereinbefore described and illustrated, it is to be understood that the invention is not limited thereto as it may be otherwise variously modified and embodied without departing from the spirit of the invention, as set forth in the following claims.

What I claim is:

1. A hydraulic power transmission device of the differential pumping type including a delivery pump and a receiving pump, driving and driven members and variable coupling means in addition to the fluid medium within the pumps, said means being adapted either to operatively connect an element of one of said pumps to one of said members or to connect such element to a stationary part of the device.

2. A hydraulic power transmission device of the differential pumping type including a delivery pump and a receiving pump, driving and driven members and variable mechanical coupling means adapted either to operatively connect an element of one of said pumps to one of said members or to connect such element to a stationary part of the device.

3. A hydraulic power transmission device including delivery and receiving pumps, and means to vary the relative pumping capacity of said pumps, said means comprising a variable coupling device adapted either to connect an element of one of said pumps to one part of the transmission or to connect said pump element to another part as between which and said first-mentioned part a difference in speed exists.

4. A hydraulic power transmission device including delivery and receiving pumps in fluid communication, each of said pumps having relatively movable coacting pump elements, and a variable mechanical coupling to alter the speed of one of the coacting pump elements without varying the capacity per revolution of either of the said pumps.

5. A hydraulic power transmission device of the differential pumping type including a pump adapted to act either as a delivery pump or a receiving pump, a second pump adapted to act as a delivery pump, a third pump adapted to act as a receiving pump, valve means interposed between the two first-mentioned pumps on the one hand and the said third pump on the other hand, and selective coupling means adapted to operatively connect an element of the second delivery pump either with a moving part of the device or with another part as between which and said first-mentioned part a difference in speed exists.

6. A hydraulic power transmission device of the differential pumping type including three pump devices, fluid conduits connecting said devices, valve means interposed between one of said pump devices and the other two pump devices, and mechanical means adapted in two different positive drive positions to positively determine two pumping rates for one of the said other two pump devices.

7. A hydraulic power transmission device of the differential pumping type including a plurality of pumps in permanent fluid communication and at least one other pump, valve means interposed between said first-mentioned pumps on the one hand and the said other pump on the other hand, and selective mechanical coupling means adapted either to connect an element of one of said first-mentioned pumps to a moving part of the transmission or to a stationary part.

8. A hydraulic power transmission device including a driving rotor, three rotatable pump elements co-operating with said driving rotor to form three pumps, one of said elements being connected to a driven shaft, another of said elements comprising a stator releasable for free rotation, the third pump element comprising a special rotor adapted to be operatively connected to a rotating part of the transmission device or to a stationary part, and variable coupling means adapted either to connect said special rotor with a rotating part of the transmission device or with a stationary part.

9. A hydraulic power transmission device of the differential pumping type including two co-operating elements of a fluid pump and selective coupling means adapted either to connect one of said elements to a moving part of the device or to a stationary part.

10. A hydraulic power transmission device of the differential pumping type including a driving part, a driven part, and a stationary part, a fluid pump interposed between said driving and driven parts, a fluid pump between said driving and stationary parts, a third fluid pump, variable coupling means adapted selectively to connect said third pump between said driving and driven parts or between said driving and stationary parts, the pressure chamber of said first-mentioned pump and the pressure chamber of the said third pump commonly communicating with a pressure conduit, and a valve to control the flow of fluid between said communicating pumps on the one hand and the pump connected between said driving and stationary parts on the other hand.

11. A hydraulic power transmission device of the differential pumping type, said device having first, a delivery pump; second, a receiving pump; and third, a special delivery pump, the relative speed of which can be varied, said delivery pumps commonly delivering fluid to said receiving pump and the combined fluid delivery of said delivery pumps being altered by varying the speed of said special delivery pump whereby the transmission driving ratio may be varied.

12. A hydraulic power transmission device of the differential pumping type, said device including pump elements interposed between a driving part and a driven part, pump elements interposed between said driving part and a stationary part, and a special pump having two elements, one element of which is connected to the driving part, the other element thereof being adapted to be connected to the said driven part at one time and to a stationary part at another time.

13. A hydraulic power transmission device of the differential pumping type, said device including a pump element connected to a driving part, a second pump element co-operating with said first-mentioned element to form a fluid pump, and selective coupling means adapted to operatively connect said second pump element with either a driven part or a stationary part of the device.

14. A hydraulic power transmission device, according to claim 13, further characterized in that said coupling means comprises a ratchet device adapted to operatively connect said second pump element to the driven part so that driving torque will be applied by such element to the driven part, and a brake device adapted to prevent said second pump element from rotating when a different transmission ratio is required.

15. A hydraulic power transmission device, according to claim 13, further characterized in that said coupling means comprises a ratchet device adapted to operatively connect said second pump element to the driven part so that driving torque will be applied by such element to the driven part, and a brake device adapted to prevent said second pump element from rotating when a different transmission ratio is required, and automatic control means adapted to automatically apply and release said brake device.

16. A hydraulic power transmission device, according to claim 13, further characterized in that said coupling means comprises a ratchet device adapted to operatively connect said second pump element to the driven part so that driving torque will be applied by such element to the driven part, and a brake device adapted to prevent said second pump element from rotating when a different transmission ratio is required, automatic control means adapted to automatically apply and release said brake device, and manually operable means to apply said brake independently of said automatic control means.

17. A hydraulic power transmission device, according to claim 13, further characterized in that said coupling means comprises a drum connected to said second pump element, a brake member acting on said drum to check its rotation, a ratchet device operatively connecting said drum with the driven part when the drum is free and tends to rotate in the direction of and faster than the driven part.

18. A hydraulic power transmission device including a plurality of co-acting pumps, valve means therefor, automatic valve control means adapted to automatically adjust said valve means to establish a plurality of substantially definite transmission ratios, and manually operable coupling means adapted to increase or decrease the transmission ratio independently of said automatic valve control means.

19. A hydraulic power transmission device including a rotary delivery pump, a plurality of abutments dividing said pump into pressure chambers, a rotary receiving pump, a plurality of abutments dividing said receiving pump into pressure chambers, an external rotor common to said pumps, channels connecting pressure chambers of the said pumps into co-operating groups, said channels forming a part of said rotor and pressure equalizing passages connecting said groups.

20. A hydraulic power transmission device including delivery and receiving pumps, a rotor common to said pumps, each of said pumps having a plurality of pressure chambers, channels mounted in and rotating with said rotor, said channels connecting said pressure chambers of the pumps together in co-acting pairs, and equalizing conduits providing fluid communication between said co-acting pairs of pressure chambers.

In witness whereof, I have hereunto signed my name.

SVEN GUSTAF WINGQUIST.